United States Patent
Tsuji et al.

(10) Patent No.: US 7,153,591 B2
(45) Date of Patent: Dec. 26, 2006

(54) SLIDING MEMBER

(75) Inventors: Hideo Tsuji, Inuyama (JP); Masahito Fujita, Inuyama (JP); Naohisa Kawakami, Inuyama (JP); Koue Ohkawa, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 38 days.

(21) Appl. No.: 10/870,464

(22) Filed: Jun. 18, 2004

(65) Prior Publication Data

US 2004/0265618 A1 Dec. 30, 2004

(30) Foreign Application Priority Data

Jun. 30, 2003 (JP) ............................. 2003-187726

(51) Int. Cl.
*B32B 15/01* (2006.01)
*B32B 15/20* (2006.01)
*F16C 32/00* (2006.01)

(52) U.S. Cl. ................... 428/648; 428/975; 384/913
(58) Field of Classification Search ............. 428/648, 428/675; 384/913
See application file for complete search history.

(56) References Cited

U.S. PATENT DOCUMENTS

| | | | | |
|---|---|---|---|---|
| 5,300,368 A | * | 4/1994 | Kubert et al. | 428/610 |
| 5,817,397 A | * | 10/1998 | Kamiya et al. | 428/141 |
| 5,911,513 A | * | 6/1999 | Tsuji et al. | 384/276 |
| 6,357,919 B1 | * | 3/2002 | Kawachi et al. | 384/276 |
| 6,451,452 B1 | * | 9/2002 | Niegel et al. | 428/648 |
| 6,492,039 B1 | * | 12/2002 | Huhn et al. | 428/648 |
| 6,575,635 B1 | * | 6/2003 | Tsuji et al. | 384/276 |
| 6,770,383 B1 | * | 8/2004 | Tanaka et al. | 428/648 |
| 6,939,621 B1 | * | 9/2005 | Hara et al. | 428/647 |
| 2004/0264820 A1 | * | 12/2004 | Tsuji et al. | |

FOREIGN PATENT DOCUMENTS

| | | |
|---|---|---|
| DE | 36 23 929 A1 | 7/1986 |
| DE | 199 63 385 C1 | 12/1999 |
| GB | 2 256 903 A | 12/1992 |
| JP | 06-280090 A | 10/1994 |
| JP | 10-302867 | * 11/1998 |
| JP | 2000-345389 A | 12/2000 |
| JP | 2001-247995 | 9/2001 |
| JP | 2002-310158 A | 10/2002 |

OTHER PUBLICATIONS

JP 10-302867 English Machine Translation, Shiotani et al., Manufacture Connection Terminal of Fitting Type, Nov. 1998.*

* cited by examiner

*Primary Examiner*—Jennifer C. McNeil
*Assistant Examiner*—Jason L. Savage
(74) *Attorney, Agent, or Firm*—Browdy and Neimark, PLLC

(57) ABSTRACT

Disclosed is a sliding member having a bearing alloy layer, an intermediate layer of Ni or a Ni alloy formed on the bearing alloy layer, and an overlay layer of a Sn alloy containing Cu formed on the intermediate layer. There exist Sn—Cu compounds in the overlay layer, which protrudently extend from the intermediate layer. The hard Sn—Cu compounds contribute to the overlay layer in improving fatigue resistance property. A soft Sn matrix being rich in an outer surface region of the overlay layer is responsible for keeping good conformability to have excellent anti-seizure property.

16 Claims, 2 Drawing Sheets

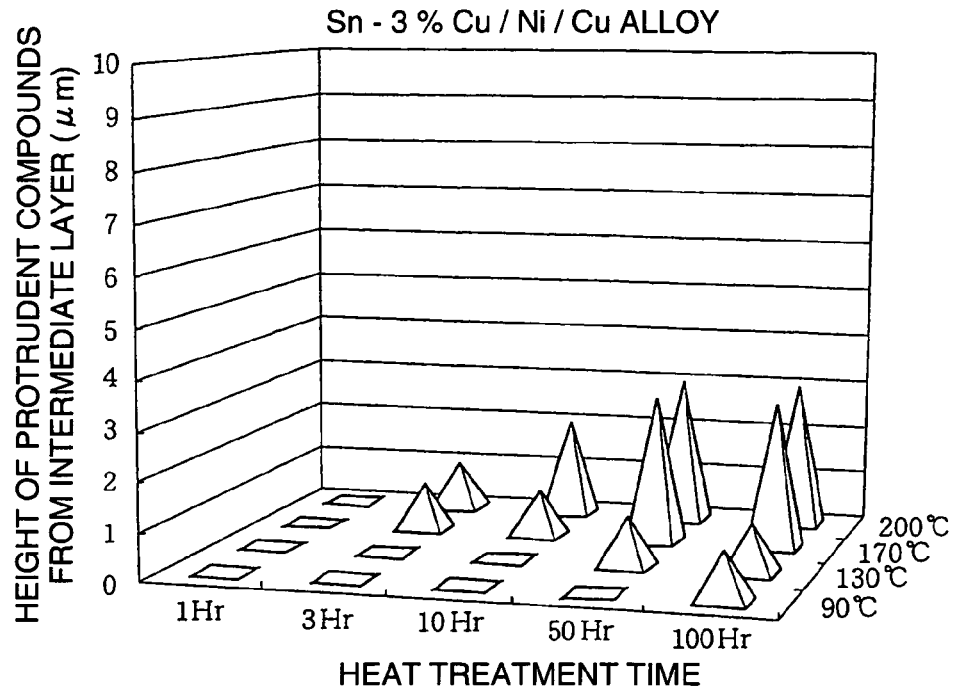
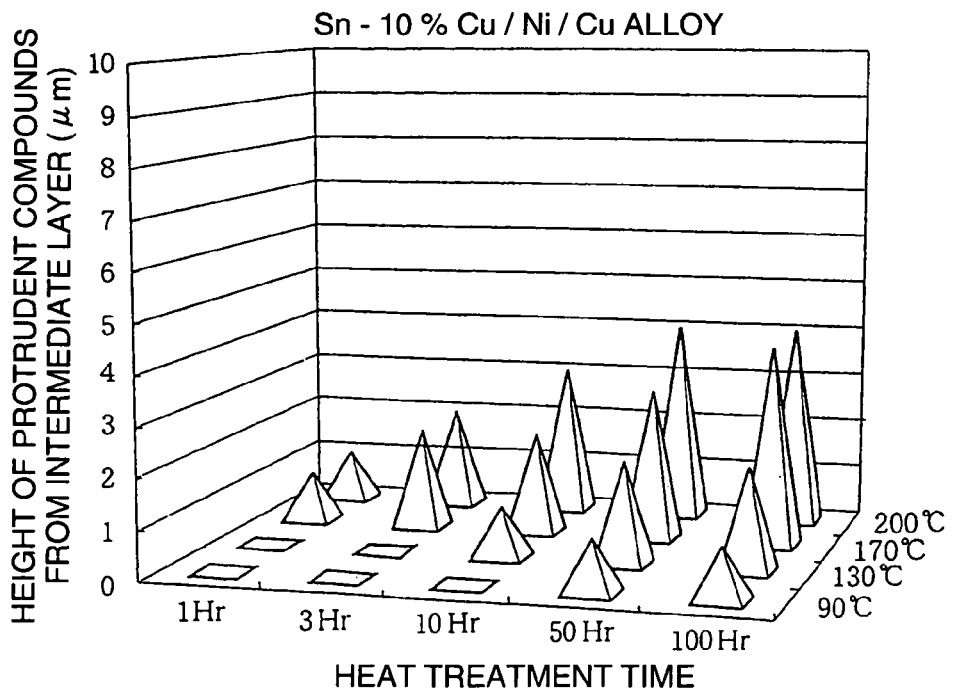

SLIDING MEMBER

BACKGROUND OF THE INVENTION

Technical Field

The present invention relates to a sliding member formed by providing an overlay layer of a Sn alloy on a bearing alloy layer through an intermediate layer of Ni or a Ni alloy.

Plain bearings formed by lining a bearing alloy layer of a Cu alloy or an Al alloy on a steel back layer have been much used for bearings in internal combustion engines of automobiles. In such bearings, an overlay layer is ordinarily formed through an intermediate layer or directly on a surface of the bearing alloy layer in order to improve conformability to a mating shaft.

Conventionally, a soft Pb alloy has been used as the overlay layer. However, the Pb alloy involves problems that it is low in corrosion resistance and severely worn due to corrosion and that cavitation erosion is liable to occur.

Hereupon, in order to solve the problems in corrosion resistance and cavitation resistance, a Sn alloy has been recently used in place of the Pb alloy. In the case where the Sn alloy is used, an overlay layer is formed on a bearing alloy layer through an intermediate layer made of Ni or a Ni alloy. The intermediate layer, as an adhesion layer, serves as a diffusion preventive layer that prevents Sn in the overlay layer from diffusing into a Cu matrix of the bearing alloy layer especially in the case where the bearing alloy is of a Cu alloy.

However, with regard to such an overlay layer made of a Sn alloy, since the Sn alloy is soft and excellent in conformability but involves a problem in fatigue resistance, various countermeasure have been adopted for the purpose of an improvement in fatigue resistance. One instance is a Sn alloy in a Sn matrix of which Sn—Cu grains having a high strength are embedded (see, for example, JP-A-2001-247995).

According to the Sn alloy shown in the above publication, a Sn—Cu system compound is dispersed in the Sn matrix. Since the Sn matrix is soft, however, the Sn—Cu system compound cannot bear a load in such a state that the Sn—Cu system compound with a high strength is dispersed in the soft Sn matrix, and consequently it is not possible to expect an improvement in fatigue resistance.

SUMMARY OF THE INVENTION

The present invention is proposed under the above technical background, and an object of which is to provide a sliding member capable of achieving an improvement in fatigue resistance without deteriorating conformability of an overlay layer.

Accordingly, there is provided a sliding member comprising a bearing alloy layer, an intermediate layer of Ni or a Ni alloy formed on the bearing alloy layer, and an overlay layer of a Sn alloy containing Cu formed on the intermediate layer, wherein there exist protrudent Sn—Cu intermetallic compounds in the overlay layer, which extend from the intermediate layer.

In the case where the overlay layer containing Cu is formed on the bearing alloy layer through the intermediate layer of Ni or a Ni alloy, Sn—Cu intermetallic compounds are formed in the overlay layer. Thereafter, when the material is subjected to heat treatment, the Sn—Cu compounds in the overlay layer are drawn to Ni of the intermediate layer to form protrudent Sn—Cu compounds in the overlay layer, which extend like column from the intermediate layer as shown in FIG. 1. Advantageously, the heat treatment for formation of the protrudent Sn—Cu compounds is conducted at a temperature of 140 to 200° C.

The Sn—Cu compounds are hard and high in strength. Therefore, the protrudent Sn—Cu compounds extending from the intermediate layer can bear a load from a mating member and enhance the fatigue resistance of the overlay layer. That is, even if the Sn—Cu compounds are present in the overlay layer, the function of the Sn—Cu compounds that bear the load cannot be expected much because of softness of a Sn matrix of the overlay layer in the case where the Sn—Cu compounds are dispersed in the Sn matrix. However, in the case where the protrudent Sn—Cu compounds extend toward an outer surface of the overlay layer from the intermediate layer of hard Ni or the Ni alloy, the function of the Sn—Cu compounds that bear a load exhibits itself adequately to enhance the fatigue resistance of the overlay layer.

Also, since the Sn—Cu compounds are drawn toward the intermediate layer, they lessen toward the outer surface of the overlay layer, in other words, the soft Sn matrix increases toward the outer surface of the overlay layer, whereby the overlay layer has good conformability to a mating member and excellent anti-seizure property.

The overlay layer preferably contains 5 to 20 mass % Cu. When the Cu content is 5 to 20 mass %, an enough quantity of Sn—Cu compounds can be formed to achieve a further improvement in fatigue resistance of the overlay layer. Also, it is possible to ensure a further favorable conformability and an embeddability of foreign-substances.

It is preferable that a thickness T of the overlay layer meets the following equation (1) under a limitation of not more than 30 µm:

$$T(\mu m) \leq (1.2 \times A) + 15 \qquad (1)$$

(where A is the Cu content in mass %).

An amount, by which the protrudent Sn—Cu compounds extend from the intermediate layer, is related to the Cu content such that the more a quantity of Cu, the larger the protrudent Sn—Cu compounds grow. However, after the Cu content reaches a certain quantity, the rate of growth of the Sn—Cu compounds is retarded even when the Cu content is increased.

When a thickness of the overlay layer is large as compared with a height of the protrudent Sn—Cu compounds, the Sn matrix on the Sn—Cu system compound is increased in thickness, and so the overlay layer tends to be decreased in fatigue resistance. According to a fatigue test performed by the present inventors, in which the Cu content of the overlay layer and the thickness of the overlay layer were differently changed, an especially favorable fatigue strength could be obtained provided that a thickness of the overlay layer met the equation (1) until the Cu content reached a certain quantity. When the Cu content exceeded the certain quantity, a thickness found by the equation (1) was in excess of 30 µm. However, the overlay layer having a thickness of not more than 30 µm was more excellent in fatigue resistance than one having a thickness of more than 30 µm. The reason for this is that when a Cu content exceeds the certain quantity, the protrudent Sn—Cu compounds are restricted in growth. It has become apparent that a favorable fatigue strength is easily obtainable when a Cu content is the certain quantity or less and a thickness of the overlay layer is not more than 30 μm.

It is preferable that a thickness of the overlay layer be not less than 5 μm.

When the overlay layer is too thin, the Sn—Cu compounds grow near to the outer surface of the overlay layer and the Sn matrix in a surface portion lessens too much. In the case of not less than 5 μm, the Sn matrix having an proper thickness can be ensured and a favorable conformability can be ensured.

The overlay layer can contain not more than 10 mass % Ag and/or not more than 15 mass % Sb.

Ag is present in a state of being a compound with Sn to enhance the overlay layer in strength. Sb dissolves in the Sn matrix to enhance the overlay layer in strength. Not more than 10 mass % Ag will not make the overlay layer too hard, so that it is possible to ensure a proper foreign-substance embeddability and a proper conformability. If the Sb content exceeds 8 mass %, hard Sn—Sb compounds are formed. However, in the case where the Sb content is not more than 15 mass %, the Sn—Sb compounds will not be formed too much, whereby it is possible to maintain a proper conformability.

Also, it is preferable that the intermediate layer has a thickness of 1 to 5 μm.

The intermediate layer is made of Ni or a Ni alloy to increase the overlay layer in bonding strength to the bearing alloy layer and to prevent Sn in the overlay layer from diffusion into the bearing alloy layer. Also, by using Ni or a Ni alloy having a high bonding strength to the Sn—Cu system compound, it is possible to grow protrudent Sn—Cu compounds extending into the overlay layer from the intermediate layer. When the intermediate layer has a thickness of 1 to 5 μm, the respective functions including the bonding strength, prevention of diffusion, and acceleration of growth of the protrudent Sn—Cu system compounds exhibit themselves favorably.

BRIEF DESCRIPTION OF THE SEVERAL VIEWS OF THE DRAWING

FIG. 2 is a view showing heat treatment conditions;

FIG. 3 is a view showing heat treatment conditions; and

DETAILED DESCRIPTION OF THE INVENTION

An embodiment of the invention will be described below.

Figure 1:
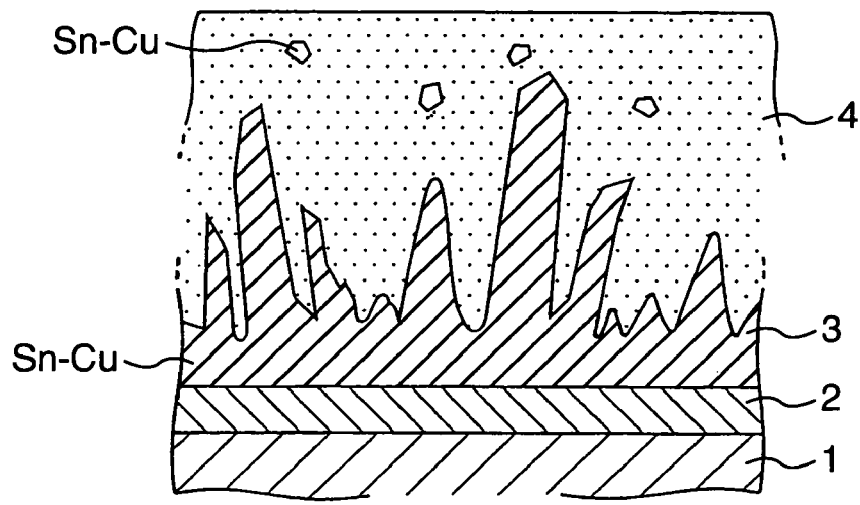
FIG. 1 is a schematic view showing a structure of a sliding member according to an embodiment of the invention.

After a bearing alloy layer 1 of a Cu alloy was formed on a steel back metal (not shown) by sintering or casting, a hemi-circular intermediate product was produced by machining. Thereafter, an intermediate layer 2 and an overlay layer 4, which had compositions and thicknesses shown in the following Table 1, were sequentially formed on an inner peripheral surface of hemi-circular intermediate product by plating to obtain a bearing half. For specimen Nos. 1 to 13 (Invention Specimens), the bearing halves were subjected to heat treatment at 150° C. for 5 hours, whereby forming Sn—Cu compounds 3 protrudently extending into the overlay layer 4 from the intermediate layer 2 in the respective specimens. FIG. 1 is a schematic view showing a cut surface of a bearing half when observed with a microscope. As shown in the drawing, it can be seen that the protrudent Sn—Cu compounds 3 grow in the overlay layer 4 to extend from the intermediate layer 2 toward an outer surface of the overlay layer 4.

Also, for specimen Nos. 14 to 18 (Comparative Specimens), the bearing halves were subjected to heat treatment at 130° C. for 1 hour. Protrudent Sn—Cu compounds were not formed in the overlay layer in the respective specimens.

TABLE 1

| Specimen No. | Overlay layer Chemical composition (mass %) | | | | | Thickness (μm) | Intermediate layer Component | Thickness (μm) | Protrudent compound | Result of fatigue test |
|---|---|---|---|---|---|---|---|---|---|---|
| | Sn | Cu | Ag | Sb | Pb | | | | | |
| 1 | Bal. | 11 | 3 | — | — | 20 | Ni | 2 | YES | X |
| 2 | Bal. | 17 | — | — | — | 18 | Ni | 3 | YES | X |
| 3 | Bal. | 16 | — | — | — | 28 | Ni | 5 | YES | X |
| 4 | Bal. | 12 | — | — | — | 18 | Ni-20Cu | 2 | YES | X |
| 5 | Bal. | 9 | — | 5 | — | 8 | Ni | 1 | YES | X |
| 6 | Bal. | 6 | — | — | — | 20 | Ni-20Cu | 2 | YES | X |
| 7 | Bal. | 16 | — | — | — | 7 | Ni | 3 | YES | X |
| 8 | Bal. | 19 | — | — | — | 28 | Ni | 5 | YES | X |
| 9 | Bal. | 12 | — | 10 | — | 28 | Ni | 1 | YES | X |
| 10 | Bal. | 19 | — | — | — | 15 | Ni | 2 | YES | X |
| 11 | Bal. | 19 | — | — | — | 35 | Ni | 5 | YES | Y |
| 12 | Bal. | 6 | — | — | — | 25 | Ni | 2 | YES | Y |
| 13 | Bal. | 11 | — | — | — | 30 | Ni-20Cu | 2 | YES | Y |
| 14 | Bal. | 4 | — | — | — | 15 | Ni | 2 | NO | Z |
| 15 | Bal. | 16 | — | — | — | 3 | Ni | 2 | NO | Occurrence of seizure |
| 16 | Bal. | 8 | — | — | — | 18 | Ni | 2 | NO | Z |

TABLE 1-continued

| Specimen No. | Overlay layer | | | | | | Intermediate layer | | Protrudent compound | Result of fatigue test |
|---|---|---|---|---|---|---|---|---|---|---|
| | Chemical composition (mass %) | | | | | Thickness (μm) | Component | Thickness (μm) | | |
| | Sn | Cu | Ag | Sb | Pb | | | | | |
| 17 | Bal. | 14 | — | — | — | 26 | Ni | 2 | NO | Z |
| 18 | 12 | 4 | — | — | Bal. | 20 | Ni | 2 | NO | Z |

*Note:
The symbol "X" represents the case of no fatigue. The symbol "Y" represents the case where an area ratio of fatigue was less than 5%, in which the area ratio was determined by calculating a rate of an area where fatigue occurred to a projected area of a specimen. And The symbol "Z" represents the case where the area ratio of fatigue was not less than 5%.

While it is preferable that the heat treatment for forming protrudent Sn—Cu compounds be carried out at a temperature ranging from 140° C. to 200° C. for 1 to 10 hours, optimum heat-treatment conditions differ depending upon the Cu content in the overlay layer. For example, FIGS. 2 and 3 show results of measurement of presence and absence of formation of protrudent Sn—Cu compounds and a size (height from an intermediate layer) of the compound in the case where heat treatment under various conditions was applied to a bearing half, in which a bearing alloy was a Cu alloy, an intermediate layer was pure Ni, and an overlay layer was made of Sn-3Cu (in mass %) (FIG. 2) and Sn-10Cu (in mass %) (FIG. 3).

More specifically, in the case where a Cu content in FIG. 2 was as little as 3 mass %, protrudent Sn—Cu compounds were formed with heating at 90° C. for not less than 100 hours, with heating at 130° C. for not less than 50 hours, and with heating at not lower than 170° C. for not less than 3 hours. In the case where a Cu content in FIG. 3 was as much as 10 mass %, protrudent Sn—Cu compounds was formed with heating at 90° C. for 50 hours or more, with heating at 130° C. for 10 hours or more, and with heating at 170° C. or higher for 1 hour or more.

Figure 4:
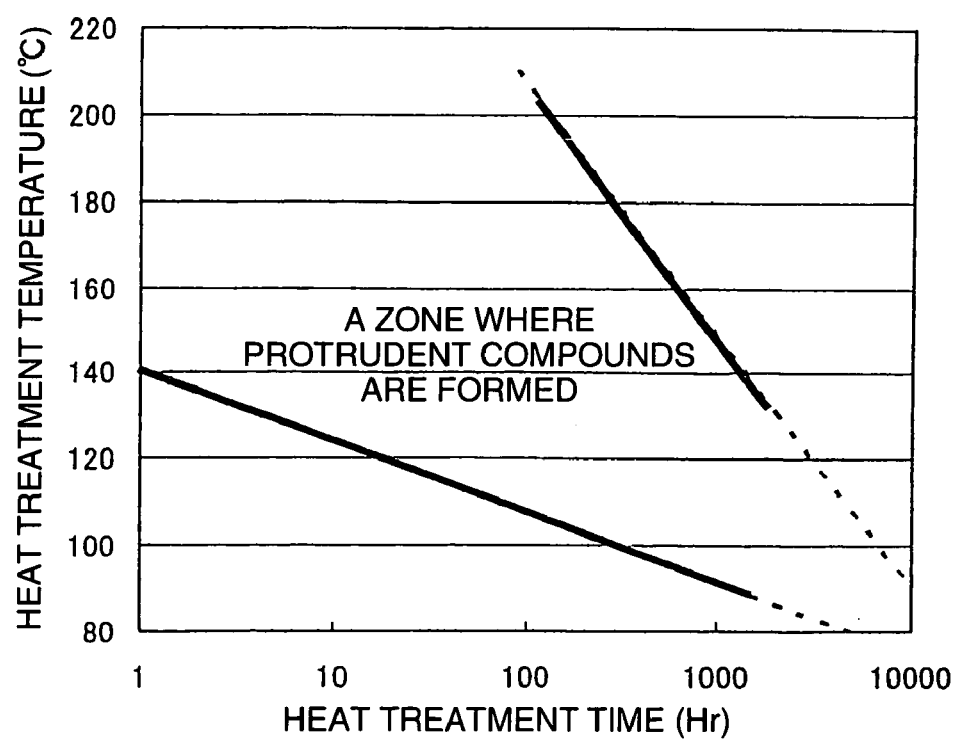
FIG. 4 is a view showing heat treatment conditions, in which proper protrudent Sn—Cu compounds are formed.

Also, FIG. 4 shows a range (interposed between two thick solid lines), in which proper (favorable results are obtained in terms of both fatigue resistance and conformability) protrudent Sn—Cu compounds are formed in the case where heat treatment under various conditions is applied to a half bearing (the same as specimen No. 4), in which a bearing alloy is a Cu alloy, an intermediate layer is Ni-20 mass % Cu, and an overlay layer is Sn-12 mass % Cu.

In this manner, optimum heat-treatment conditions differ depending upon a Cu content. Various experiments for examination of the relationship between a Cu content and optimum heat-treatment conditions were repeated with the result that a relational expression for a heat-treatment temperature and a height of protrudent Sn—Cu compounds from an intermediate layer was found. The relational expression is indicated by the following equation (2).

$$\text{Height (μm)} \approx (0.07 \times \text{Cu (mass \%)}) + (0.016 \times \text{temperature (°C.)} \times \text{Log}_{10} \text{ heat-treatment time (hour)}) - 0.34 \quad (2)$$

For the respective specimens, presence and absence of fatigue in the specimens were confirmed after a bearing dynamic-load testing machine was used to operate for 20 hours under the conditions of surface pressure of 50 MPa, the number of revolutions of 3250 rpm, and the lubrication temperature of 100° C. Results of the test are shown in Table 1. In the results of the fatigue test, the symbol "X" represents the case of no fatigue, the symbol "Y" represents the case where an area ratio of fatigue was less than 5%, in which the area ratio was determined by calculating a rate of an area where fatigue occurred to a projected area of a specimen, and the symbol "Z" represents the case where the area ratio of fatigue was not less than 5%.

The results of the fatigue test will be studied below.

Specimen No. 15 out of the specimen Nos. 14 to 18 (Comparative Specimens), in which no Sn—Cu compounds protrudently extended from the intermediate layer was formed in the overlay layer, had a thin surface layer and underwent seizure in the test. Since no protrudent Sn—Cu compounds was formed in the specimen Nos. 14, 16 and 17, fatigue occurred. The conventionally used specimen No. 18 made of a Pb alloy also underwent fatigue.

In contrast, specimen Nos. 1 to 10 out of specimen Nos. 1 to 13, in which protrudent Sn—Cu compounds were formed in the overlay layer, were free from generation of any portion undergoing fatigue and excellent in fatigue resistance. A portion undergoing fatigue was found in specimen Nos. 11 to 13 but it was limited to a small area ratio of less than 5% and exhibited fatigue resistance that was not problematic in practical use.

What is claimed is:

1. A sliding member comprising a bearing alloy layer, an intermediate layer of Ni or a Ni alloy formed on the bearing alloy layer, and an overlay layer of a Sn alloy containing Cu formed on the intermediate layer,
    wherein there exist Sn—Cu compounds in the overlay layer, which protrudently extend from the intermediate layer
    wherein a thickness T of the overlay layer meets the following equation under a limitation of not more than 30 μm:
    $T(\mu m) \leq (1.2 \times A) + 15$ (where A is the Cu content in mass %).

2. A sliding member according to claim 1, wherein the overlay layer contains 5 to 20 mass % Cu.

3. A sliding member according to claim 2, wherein the overlay layer contains not more than 10 mass % Ag and/or not more than 15 mass % Sb.

4. A sliding member according to claim 3, wherein the intermediate layer has a thickness of 1 to 5 μm.

5. A sliding member according to claim 2, wherein the intermediate layer has a thickness of 1 to 5 μm.

6. A sliding member according to claim 1, wherein a thickness of the overlay layer is 5 μm or more.

7. A sliding member according to claim 6, wherein the intermediate layer has a thickness of 1 to 5 μm.

8. A sliding member according to claim 1, wherein the overlay layer contains not more than 10 mass % Ag and/or not more than 15 mass % Sb.

9. A sliding member according to claim 8, wherein the intermediate layer has a thickness of 1 to 5 μm.

10. A sliding member according to claim 1, wherein the intermediate layer has a thickness of 1 to 5 μm.

11. A sliding member comprising a bearing alloy layer, an intermediate layer of Ni or a Ni alloy formed on the bearing alloy layer, and an overlay layer of a Sn alloy containing Cu formed on the intermediate layer, wherein there exist Sn—Cu compounds in the overlay layer, which protrudently extend as column-like structures from the intermediate layer;

wherein the overlay layer contains 5 to 20 mass % Cu; and wherein a thickness T of the overlay layer meets the following equation under a limitation of not more than 30 μm:

$T(\mu m) \leqq (1.2 \times A) + 15$ (where A is the Cu content in mass %).

12. A sliding member according to claim 11, wherein a thickness of the overlay layer is 5 μm or more.

13. A sliding member according to claim 12, wherein the overlay layer contains not more than 10 mass % Ag and/or not more than 15 mass % Sb.

14. A sliding member according to claim 13, wherein the intermediate layer has a thickness of 1 to 5 μm.

15. A sliding member according to claim 12, wherein the intermediate layer has a thickness of 1 to 5 μm.

16. A sliding member according to claim 11, wherein the intermediate layer has a thickness of 1 to 5 μm.

* * * * *